United States Patent
Mueller et al.

(10) Patent No.: US 9,300,209 B2
(45) Date of Patent: Mar. 29, 2016

(54) BIDIRECTIONAL CONVERTER WITH PREFERENTIAL DIRECTION AND REACTIVE POWER-CAPABLE INVERTER HAVING SAID CONVERTER

(71) Applicant: SMA Solar Technology AG, Niestetal (DE)

(72) Inventors: Burkard Mueller, Kassel (DE); Jens Friebe, Vellmar (DE); Torsten Leifert, Kassel (DE)

(73) Assignee: SMA SOLAR TECHNOLOGY AG, Niestetal (DE)

( * ) Notice: Subject to any disclaimer, the term of this patent is extended or adjusted under 35 U.S.C. 154(b) by 1 day.

(21) Appl. No.: 14/492,137

(22) Filed: Sep. 22, 2014

(65) Prior Publication Data

US 2015/0085550 A1 Mar. 26, 2015

(30) Foreign Application Priority Data

Sep. 23, 2013 (DE) .......................... 10 2013 110 507

(51) Int. Cl.
*H02M 7/04* (2006.01)
*H02M 3/158* (2006.01)
(Continued)

(52) U.S. Cl.
CPC ............ *H02M 3/158* (2013.01); *H02M 1/4233* (2013.01); *H02M 7/538* (2013.01); *H02M 7/797* (2013.01)

(58) Field of Classification Search
CPC ... H02M 3/158; H02M 7/797; Y02B 70/1425
USPC ........... 363/16–20, 24, 25, 37, 65, 71, 89, 97; 323/222, 224, 225, 267, 271, 282
See application file for complete search history.

(56) References Cited

U.S. PATENT DOCUMENTS

| | | | |
|---|---|---|---|
| 5,107,151 A | 4/1992 | Cambier | |
| 5,146,399 A * | 9/1992 | Gucyski | ................. H02M 1/10 323/222 |

(Continued)

FOREIGN PATENT DOCUMENTS

| | | |
|---|---|---|
| CH | 700030 B1 | 6/2010 |
| EP | 1603224 A1 | 12/2005 |

(Continued)

OTHER PUBLICATIONS

Wu, et al. "Nonisolated Bidirectional DC-DC Converters With Negative-Coupled Inductor." IEEE Transactions on Power Electronics, vol. 27, No. 5. May 2012.

*Primary Examiner* — Rajnikant Patel
(74) *Attorney, Agent, or Firm* — Eschweiler & Associates, LLC

(57) ABSTRACT

A half-bridge of a bidirectional converter is divided into a first and a second conduction path connected in parallel. In each of the conduction paths a switching element and a freewheeling diode are connected in series, and the center points of the conduction paths are connected via a second inductor. The second inductor is connected in series with a first inductor which is connected to the center point of the second conduction path. The half-bridge has two operating modes. In each of the two operating modes the switching element in one of the two conduction paths is clocked at a high frequency to cause a flow of energy in one of two directions between a pair of high voltage-side connections and a pair of low voltage-side connections to the half-bridge. The two switching elements are of different types, the switching element in the first conduction path causing higher switching losses.

16 Claims, 4 Drawing Sheets

(51) Int. Cl.
*H02M 7/538* (2007.01)
*H02M 7/797* (2006.01)
*H02M 1/42* (2007.01)

(56) References Cited

U.S. PATENT DOCUMENTS

| | | | |
|---|---|---|---|
| 5,383,109 A * | 1/1995 | Maksimovic | H02M 1/10 323/222 |
| 6,232,752 B1 * | 5/2001 | Bissell | H02M 3/1582 323/222 |
| 6,294,900 B1 * | 9/2001 | Greenwood | H02M 3/33584 323/222 |
| 6,847,196 B2 | 1/2005 | Garabandic | |
| 7,167,383 B2 * | 1/2007 | Iwakura | H02M 3/158 323/225 |
| 8,471,535 B2 | 6/2013 | Kora et al. | |
| 2011/0013438 A1 | 1/2011 | Frisch et al. | |
| 2011/0273159 A1 | 11/2011 | Tabata | |

FOREIGN PATENT DOCUMENTS

| | | |
|---|---|---|
| EP | 2421135 A2 | 2/2012 |
| EP | 2515424 A2 | 10/2012 |
| JP | 2008079352 A | 4/2008 |
| WO | 91/03104 A1 | 3/1991 |
| WO | 2010/006695 A1 | 1/2010 |

* cited by examiner

BIDIRECTIONAL CONVERTER WITH PREFERENTIAL DIRECTION AND REACTIVE POWER-CAPABLE INVERTER HAVING SAID CONVERTER

REFERENCES TO RELATED APPLICATION

The application claims priority to German Patent Application No. 10 2013 110 507.6, entitled, "Bidirektionaler Wandler mit Vorzugsrichtung and blindleistungsfähige Wechselrichter mit diesem Wandler," filed on Sep. 23, 2013.

FIELD

The disclosure relates to a bidirectional converter. More particular, the disclosure relates to a bidirectional converter that can be used as a bidirectional DC-to-DC converter, for example, between two DC-voltage intermediate circuits. The disclosure also relates to reactive power-capable inverters which have at least one bidirectional converter as a sinusoidal half wave-forming part. Inverters of this type are capable of providing not only active power but also reactive power, owing to the bidirectional design of the converter.

BACKGROUND

It is known, in principle, that a step-up converter and a step-down converter can be combined between two DC-voltage intermediate circuits to form a half-bridge, which is connected between the poles of the DC-voltage intermediate circuit for a higher intermediate circuit voltage and the center point of which is connected via an inductor to a pole of the DC-voltage intermediate circuit for the lower intermediate circuit voltage. In the case of such a half-bridge, the step-down converter freewheeling diode is connected in parallel with the step-up converter switch and the step-up converter freewheeling diode is connected in parallel with the step-down converter switch. In order to be able to keep the inductance and hence the installation size of the inductor connected to the center point of the half-bridge, the switch in the respective step-up converter operation or step-down converter operation of the half-bridge must be clocked at a high frequency (usually several ten kHz). In order to realize this with low switching losses, MOSFET semiconductor switches, which cause comparatively low switching losses when clocked at high frequency, are preferred. However, MOSFET semiconductor switches have parasitic internal diodes which are referred to as body diodes. These are connected in parallel with the freewheeling diodes of the semiconductor bridge and can therefore, in principle, become conducting under the same boundary conditions as the freewheeling diodes. However, they are not suitable for rapid switching and, in the case of rapid switching, would cause high switching losses, poor EMC behaviour and, in some circumstances, would even cause the circuit to be destroyed.

A reactive power-capable inverter having two parallel half-bridges connected between a first connection and a second connection is known from U.S. Pat. No. 6,847,196 B2. Each half-bridge has two parallel conduction paths. In each of the conduction paths a MOSFET as a switching element is connected in series with a freewheeling diode. One switching element in one of the conduction paths and one freewheeling diode in the other of the conduction paths are connected to the first and to the second connection, respectively. The center points of the two conduction paths are connected to one another via two small inductors. The connection point of the two inductors is connected via a further inductor to one alternating-current connection. The other alternating-current connection is connected to a corresponding connection point of the other half-bridge. By alternating operation of the two half-bridges as step-down converters, successive half-waves of an alternating current are formed, which are output at the alternating-current connections. The respective non-current-forming half-bridge is switched through. The alternatively possible step-up converter operation of the half-bridges makes it possible to reverse the flow of energy and hence, for example, also to output reactive power at the alternating-current connections. During operation of the known inverter, commutation of the current from the respectively clocked MOSFET to the body diode of the MOSFET in the other conduction branch of the same half-bridge is prevented by the inductive voltage division of the inductors, with the result that the current exclusively commutates onto the freewheeling diode connected in series with the clocked MOSFET in the same conduction path. The known inverter is comparatively elaborate owing to three inductors in total per half-bridge. It also has a total of four comparatively expensive MOSFETs.

A reactive power-capable inverter is known from U.S. 2011/0013438 A1, in the case of which both MOSFET semiconductor switches and IGBT semiconductor switches are used. The known inverter is of the NPC (neutral point clamped) circuit type with freewheeling diodes for outputting reactive power. U.S. 2011/0013438 A1 also describes circuits having half-bridges, in the case of which conduction paths populated with MOSFET semiconductor switches are decoupled by inductors. In the case of inverters with NPC circuit which have no more than two MOSFET semiconductor switches and two IGBT semiconductor switches, no inductors which decouple any conduction paths are provided, however.

The combination of a step-down converter circuit and a commutator to form a photovoltaic inverter is known from EP 2 421 135 A2. The step-down converter circuit forms an incoming direct current in half-waves, which are converted into an alternating current by means of the commutator circuit. The step-down converter circuit has two partial step-down converters which are designed and arranged so as to be mirror-symmetrical about a center point apart from the forward directions of their diodes and the blocking directions of their switches. Even if the step-down converter circuit enables a phase shift of the current with respect to the voltage in each half-wave, it is not unconditionally reactive power-capable. It does not enable different mathematical signs for current and voltage at the alternating-current output of the photovoltaic inverter and is therefore only able to output reactive power at a high distortion factor.

A circuit is known from U.S. Pat. No. 5,107,151 A, in the case of which two inputs are connected via a half-bridge to an output. The half-bridge has two conduction paths between the two inputs. In each of the conduction paths one switching element is connected in series with a freewheeling diode. In this case, the switching element in the one conduction path is connected to the one input and the switching element in the other conduction path is connected to the other input. The opposite applies in the case of the freewheeling diodes. Center points of the conduction paths are connected to one another via an inductor. The center point of the second conduction path is connected via a further inductor to an output of the circuit. Two of such circuits can be combined to form a full-bridge in order to drive an electric motor, wherein only one further inductor is provided in addition to the inductors between the center points of the conduction paths of the two bridges. During operation of the known circuit, in the case of each half-bridge only one of the switching elements, which is used for pulse-width modulation, is clocked at a high frequency, while the other switching element, which is used for commutation, is clocked at a low frequency. In the case of the different clock rates of the switching elements, the switching element which is clocked at a low frequency is designed as an IGBT, in contrast to the switching element which is clocked at a high frequency, which is a MOSFET. U.S. Pat. No. 5,107, 151 A does not describe a bidirectional converter or bidirectional inverter having switching elements of different design in the half-bridges.

Thus, there is still a need for a bidirectional converter and reactive power-capable inverters based thereon, which have a simple and inexpensive design while still having a high practical efficiency.

SUMMARY

In one aspect, the present disclosure provides a bidirectional converter comprising a first connection, a second connection, a third connection and a fourth connection, wherein the first and the second connection form a pair of high voltage-side connections between which a first voltage (U_high) is present during operation of the converter, and wherein the third and the fourth connection form a pair of low voltage-side connections between which a second voltage (U_low) is present during operation of the converter. The first voltage (U_high) is at least as high as the second voltage (U_low). The bidirectional converter further comprises a half-bridge, which comprises two switching elements and two freewheeling diodes, wherein the half-bridge is divided into a first conduction path and a second conduction path, which are connected in parallel between the first connection and the second connection. In each of the first and second conduction paths, one of the switching elements and one of the freewheeling diodes are connected in series, and center points of the first and second conduction paths are connected to one another via a smaller inductor. The switching element in the first conduction path is connected to another connection of the pair of high voltage-side connections in the second conduction path, and the freewheeling diode in the first conduction path is connected to another connection of the pair of high voltage-side connections in the second conduction path. The half-bridge has a first operating mode, in which the switching element in the first conduction path is clocked at a high frequency in order to cause a flow of energy in a first direction between the pair of high voltage-side connections and the pair of low voltage-side connections. The half-bridge has a second operating mode, in which it drives the switching element in the second conduction path at a high frequency in order to cause a flow of energy in a second direction which is opposite to the first direction between the pair of high voltage-side connections and the pair of low voltage-side connections. The switching element in the second conduction path has a body diode. The bidirectional converter further comprises a larger inductor, which is connected between the center point of the second conduction path and the third connection, wherein the smaller inductor and the larger inductor are connected in series between the center point of the first conduction path and the third connection, while only the larger inductor is connected between the center point of the second conduction path and the third connection. In the bidirectional converter, the two switching elements are of different types, wherein the switching element in the first conduction path does not have a body diode and causes higher switching losses than the switching element in the second conduction path. The second direction may be a preferred direction of the flow of energy between the pair of high voltage-side connections and the pair of low voltage-side connections.

In a further aspect, the present disclosure provides an inverter including the converter as defined above, and a commutator. One side of the commutator is connected to the third connection and the fourth connection of the half-bridge, and the other side of the commutator is configured to be connected to an alternating power grid.

In a further aspect, the present disclosure provides an inverter including the converter as defined above and further comprising a further half-bridge, wherein the half-bridge and the further half-bridge are designed and arranged so as to be mirror-symmetrical about a common connection of the common second connection and the common fourth connection of the two half-bridges except for the forward directions of their diodes and the blocking directions of their switching elements. The inverter further includes a commutator, one side of the commutator being connected to the third connections of the half-bridge and the further half-bridge, and the other side of the commutator being configured to be connected to an alternating power grid.

In a further aspect, the present disclosure provides an inverter including the converter as defined above and a further bidirectional converter, identical to the converter and provided between the first connection and the second connection on one side, and a fifth connection and a sixth connection on another side. An alternating power grid is connectable to the third connection and the fifth connection, which are connected via the larger inductors of the converter and the further converter to the center points of the second conduction paths of the two half-bridges of the converter and the further converter. The fourth connection and the sixth connection are connected to one another.

Other features and advantages of the present disclosure will become apparent to one skilled in the art upon examination of the following drawings and the detailed description. It is intended that all such additional features and advantages be included herein within the scope of the present disclosure, as defined in the claims.

BRIEF DESCRIPTION OF THE DRAWINGS

The disclosure will be better understood with reference to the following drawings. The components in the drawings are not necessarily to scale, emphasis instead being placed upon clearly illustrating the principles of the present disclosure. In the drawings, like reference numerals designate corresponding parts throughout the several views.

DETAILED DESCRIPTION

Figure 1:
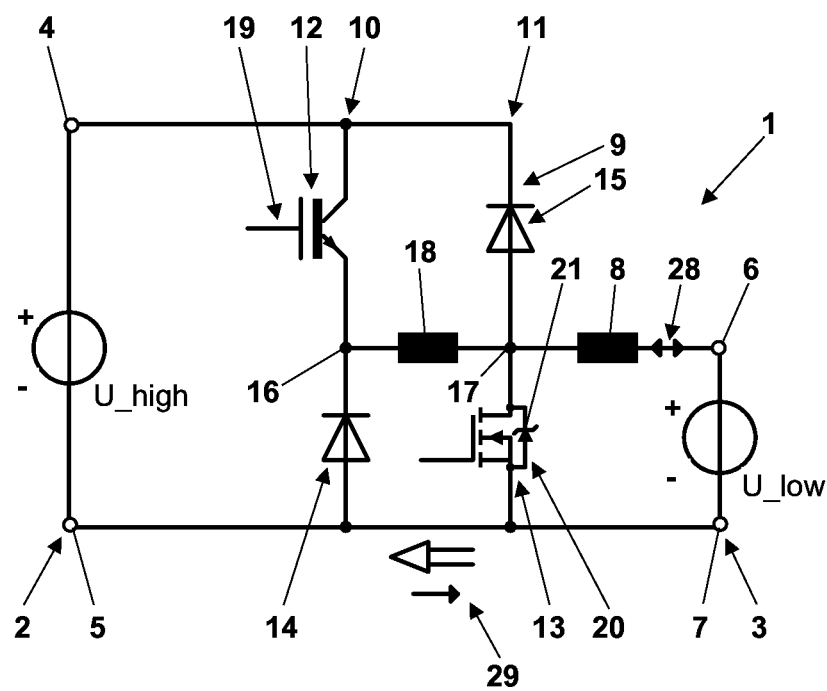
FIG. 1 shows a bidirectional converter according to the disclosure having a preferred direction of the flow of energy from an intermediate circuit with lower voltage to an intermediate circuit with higher voltage according to one embodiment.

A bidirectional converter according to the disclosure has a first connection, a second connection, a third connection and a fourth connection, wherein the first and the second connection form a pair of high voltage-side connections between which a first voltage is present during operation of the converter, and wherein the third and the fourth connection form a pair of low voltage-side connections between which a second voltage is present during operation of the converter, wherein the first voltage is at least as high as the second voltage. A bidirectional converter according to the disclosure also has a half-bridge, which comprises two switching elements and two freewheeling diodes, wherein the half-bridge is divided into a first conduction path and a second conduction path, which are connected in parallel between the first connection and the second connection. In each of the conduction paths one of the switching elements and one of the freewheeling diodes are connected in series and the center points of which conduction paths are connected to one another via a smaller inductor. The two switching elements and the two freewheeling diodes are divided in diagonal arrangement between the two conduction paths, that is to say that both the two switching elements and the two freewheeling diodes in the two conduction paths are connected to different connections of the pair of high voltage-side connections. In other words, if the one switching element is directly connected to the first connection, the other switching element is directly connected to the second connection and, in the case of the freewheeling diodes, precisely the reverse is true.

The half-bridge has a first operating mode, in which the switching element in the first conduction path is clocked at a high frequency in order to cause a flow of energy in a first direction between the pair of high voltage-side connections and the pair of low voltage-side connections. The half-bridge also has a second operating mode, in which it drives the switching element in the second conduction path at a high frequency in order to cause a flow of energy in a second direction which is opposite to the first direction between the pair of high voltage-side connections and the pair of low voltage-side connections. That is to say that, in the one direction between the pair of high voltage-side connections and the pair of low voltage-side connections, the converter acts as a step-down converter and, in the opposite direction, it acts as a step-up converter. The high-frequency clocking of the respective switching element usually takes place at a frequency from a few hundred to several 10 kHz, for example at 16 kHz, wherein a current flowing via the bidirectional converter in the respective direction between the pair of high voltage-side connections and the pair of low voltage-side connections can be formed by pulse-width modulation.

The bidirectional converter according to the disclosure additionally has a larger inductor, which is connected between the center point of the second conduction path and the third connection. The center point of a conduction path is to be understood in this connection as the connection between the switching element and the freewheeling diode within the conduction path. The center points of the two conduction paths are connected to one another via a smaller inductor. Thus, the smaller inductor and the larger inductor are connected in series between the center point of the first conduction path and the third connection, while only the larger inductor is connected between the center point of the second conduction path and the third connection.

In one embodiment the two switching elements of the half-bridge are of different types. In this case, the switching element in the first conduction path causes higher switching losses than the switching element in the second conduction path. By contrast, the switching element in the second conduction path has a body diode. The fact that the body diode acts as a freewheeling diode onto which the current is commutated when the clocked switching element in the first conduction path is opened is undesired, because this would lead to EMC problems, high switching losses and possibly even to destruction of the switching element in the second conduction path. A smaller inductor is arranged between the center points of the conduction paths so that the current instead commutates onto the freewheeling diode arranged in the first conduction path. It interacts with the larger inductor as inductive voltage divider, with the result that a higher voltage is present across the freewheeling diode in the first conduction path when the switching element in the first conduction path is closed than across the body diode of the switching element in the second conduction path. However, the smaller inductor does not have this protective function for the switching element in the first conduction path if the clocked switching element in the second conduction path is open. In the case of the closed switching element in the second conduction path and the open switching element in the first conduction path, no current flows via the smaller inductor and correspondingly no voltage drops across the small inductor in the case of subsequent interruption of the flow of current by opening the switch in the second conduction path. In the case of the bidirectional converter according to the disclosure, the switching element in the first conduction path is not one with a body diode, however, onto which commutation of the current is to be prevented. In the case of the bidirectional converter according to the disclosure, the second direction between the pair of high voltage-side connections and the pair of low voltage-side connections, in which the flow of energy is caused by high-frequency clocking of the switching element in the second conduction path with the lower switching losses, is a preferred direction of the flow of energy between the pair of high voltage-side connections and the pair of low voltage-side connections.

In practice, in the case of the bidirectional converter according to the disclosure, the switching element in the first conduction path is preferably an IGBT, while the switching element in the second conduction path is an FET (field-effect transistor) in one embodiment; this can be, for example, a JFET and, in particular, a MOSFET. In this case, the FET is connected to the first connection or the second connection such that, when it is operated in a clocked manner, power flows in a preferred direction between the one and the other pair of connections of the converter. By contrast, the IGBT is clocked in the first conduction path in order to allow power to flow in the less preferred direction between the two pairs of connections. If the preferred direction of the flow of power runs from the third and fourth connection to the first and second connection, that is to say from the pair of low voltage-side connections to the pair of high voltage-side connections, that is to say the converter according to the disclosure operates as a step-up converter, the switching element in the second conduction path is connected to the second connection, which is connected to the fourth connection. The second and the fourth connection are, like the first and the third connection, alike, that is to say of the same polarity, with respect to the voltages present.

However, if the preferred direction of the flow of energy runs from the first and second connection, that is to say from the pair of high voltage-side connections, to the pair of low voltage-side connections, wherein the converter according to the disclosure operates as a step-down converter, the switching element in the second conduction path is connected between the center point of the second conduction path and the first connection, which is not directly connected to the third connection.

Independently of the preferred direction of the flow of power or the preferred function of the bidirectional converter according to the disclosure as step-up converter or step-down converter, the switching element in the second conduction path is clocked in the second operating mode of the half-bridge in order to realize the preferred flow of power. Conversely, the switching element in the first conduction path is always clocked in the first operating mode of the half-bridge for the flow of power in the less preferred direction. Although, the switching element, which has no body diode and is, in particular, embodied as an IGBT, causes higher switching losses in the case of an identically large flow of current than the switching element in the second conduction path, in the less preferred direction of the flow of power, only small currents occur and are rarer, with the result that the worse efficiency of the IGBT is hardly of any consequence. Compared to a half-bridge having two conduction paths which are each populated with a MOSFET and are decoupled between their center points by two small inductors, the higher switching losses are more than compensated by the simpler construction of the switching element in the first conduction path and only one small inductor between the center points of the two conduction paths and hence in total only one smaller and one larger inductor for the entire half-bridge of the converter according to the disclosure. By contrast, the efficiency of the converter according to the disclosure in the preferred direction of the power transfer is particularly high, without there being risks to the body diode of the switching element in the second conduction path when the switching element in the first conduction path is clocked.

During the preferred operation of the converter according to one embodiment of the disclosure, only the larger inductor is energized. The inductance of the smaller inductor can be kept very small in comparison with the inductance of the larger inductor, since it is only used for the inductive voltage division during the less preferred operation of the converter according to the disclosure. During said less preferred operation, the smaller inductor must allow the voltage across the freewheeling diode in the first conduction path to break down only so much higher than the voltage across the switching element with the body diode in the second conduction path that only the freewheeling diode in the first conduction path becomes conducting. For this purpose, in one embodiment it is sufficient for the inductance of the smaller inductor to be less than a tenth, generally even not more than a hundredth of the inductance of the larger inductor.

The fact that the switching element in the first conduction path has no body diode does not rule out that a protective diode can be connected in parallel with the switching element. The protective diode has the same forward direction between the first and second connection as the freewheeling diode in the first conduction path. The protective diode is configured such that it only becomes conducting at a higher voltage than the freewheeling diode in the second conduction path and/or such that it is not damaged even by a larger current flowing through it. A protective diode which is only small and has a significantly higher switch-on voltage than that of the protective diode in the second conduction path is less expensive.

It goes without saying that, in the case of the bidirectional converter according to the disclosure, smoothing capacitors can be connected between the first and the second connection and/or between the third and the fourth connection.

In the case of the converter according to the disclosure, in addition to the one half-bridge described thus far, a further half-bridge can be provided, wherein the two half-bridges are designed and arranged so as to be mirror-symmetrical about a common connection of the common second connection and the common fourth connection of the two half-bridges, except for the forward directions of their diodes and the blocking directions of their switching elements. It goes without saying that the mirror-symmetrical design of the two half-bridges does not relate to the polarity of the connections and therefore neither to the forward directions of the diodes of the half-bridges nor to the blocking directions of the switching elements of the half-bridges. For each of the two half-bridges, the converter according to the disclosure has dedicated first and third connections, wherein the first and the third connection of the one half-bridge and the first and the third connection of the other half-bridge have reversed polarities.

The voltages of the first and second connections, between which the two half-bridges are connected, can then be, in particular, part voltages of a divided intermediate circuit. Likewise, the voltages between the third and fourth connections of the half-bridges can be part voltages of a further divided intermediate circuit. The center points of the two divided intermediate circuits are in this case the common second and fourth connections which are directly connected to one another.

A reactive power-capable inverter according to the disclosure having a bidirectional converter according to the disclosure can have a commutator connected to the third and fourth connection, and an alternating power grid connectable to the other side of the commutator. In this embodiment, the preferred direction of the flow of power is from the first and second connection to the third and fourth connection, that is to say the converter operates primarily as step-down converter. In one embodiment the step-up converter function thereof is restricted to the provision of feedback power in the periods in which current and voltage have different mathematical signs during the provision of reactive power.

It goes without saying that if two half-bridges which are designed and arranged so as to be mirror-symmetrical with respect to one another are provided, the commutator is connected to the two third connections of the two half-bridges.

The converter operated as step-down converter forms current half-waves which are conducted to the alternating-current connections from the commutator with alternating orientation.

In one embodiment the switches of the commutator are only clocked at system frequency and can therefore be designed as inexpensive IGBTs without significant losses owing to switching losses.

Since complete feedback capability is usually not required for inverters, but, for example, only an operation at $\cos \phi > 0.8$, the maximum system current does not regularly flow during the periods in which current and voltage have different mathematical signs. Hence, it is possible, in principle, to clock the switching element in the first conduction path more slowly than the switching element in the second conduction path and hence to allow a greater ripple current without risking magnetic saturation of the larger inductor. Thus, the higher switching losses which are associated with clocking the switching element in the first conduction path can be reduced.

A reactive power-capable inverter according to the disclosure having a bidirectional converter according to the disclosure can also be designed such that a further identically designed converter is connected on one side between the first and second connections and on the other side between fifth and sixth connections, wherein the fifth and sixth connections correspond to the third and fourth connections of the first converter. An alternating power grid is connectable to the third and fifth connections of the two converters, which are connected via the larger inductors to the center points of the second conduction paths of the two half-bridges of the two converters. The fourth and sixth connections of the two converters are connected to one another. In the case of this construction of the inverter, the two half-bridges alternately supply a half-wave of the alternating current, while the other half-bridge is connected through in order to connect the third connection directly to the fourth connection or the fifth connection directly to the sixth connection. For the direct connection, a bypass switch can be provided both between the third and the fourth connection of the first converter and the fifth and the sixth connection of the further converter, which bypass switches bypass the half-bridge of the respective converter in half-waves. In one embodiment the bypass switches are simple and inexpensive IGBTs.

Now referring in greater detail to the drawings, a converter 1 shown in FIG. 1 is connected between a DC-voltage intermediate circuit 2 with a higher voltage U_high and a DC-voltage intermediate circuit 3 with a lower voltage U_low. In this case, the converter 1 is connected via a first connection 4 and a second connection 5 to the DC-voltage intermediate circuit 2 and via a third connection 6 and a fourth connection 7 to the DC-voltage intermediate circuit 3. The fourth connection 7 is directly connected to the second connection 5. The third connection 6 is connected to a half-bridge 9 via a larger (first) inductor 8. The half-bridge 9 has two parallel conduction paths 10 and 11. Each of the conduction paths 10 and 11 runs between the connections 4 and 5, and in each of the conduction paths 10 and 11 a switching element 12 or 13 is connected in series with a freewheeling diode 14 or 15. The center points 16 or 17 of the two conduction paths 10 and 11 between the respective switching elements 12 and 13, and the respective freewheeling diodes 14 and 15 are connected to one another via a smaller (second) inductor 18, the inductance of which is only a fraction of the inductance of the larger (first) inductor, usually less than 1/10, often even not more than 1/100. The center point 17 of the conduction path 11 is connected to the larger (first) inductor 8. That is to say that the connection 6 is connected via the larger (first) inductor 8 to the center point 17 and via the two inductors 8 and 18 to the center point 16. The switching elements 12 and 13 and the freewheeling diodes 14 and 15 in the conduction paths 10 and 11 of the half-bridge 9 are arranged diagonally. That is to say the switching element 12 in the conduction path 10 is connected to the connection 4, while the switching element 13 in the conduction path 11 is connected to the connection 5. The opposite situation applies to the freewheeling diodes 14 and 15. In one embodiment the switching element 12 in the conduction path 10 is an IGBT 19, and the switching element 13 in the conduction path 11 is a MOSFET 20 with a body diode 21. The forward direction of the body diode 21 runs parallel to the forward direction of the freewheeling diode 14 in the conduction path 10.

Figure 2:
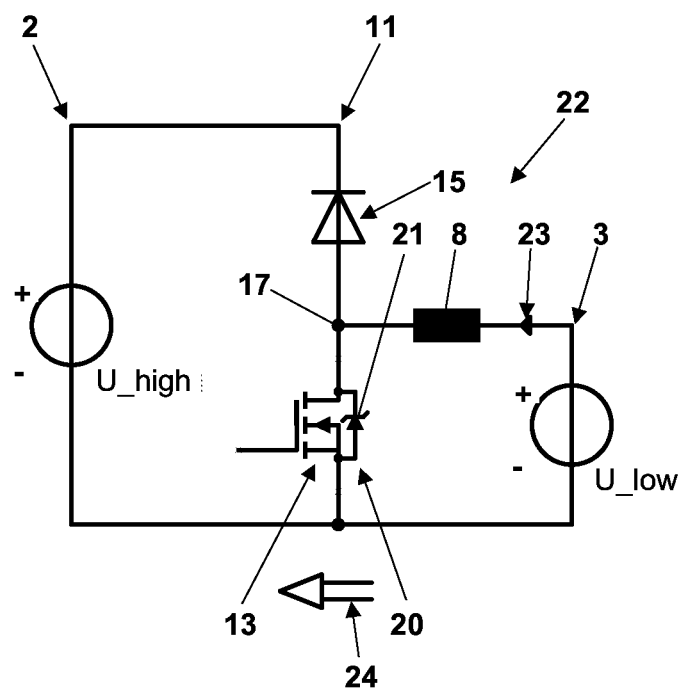
FIG. 2 shows separately the parts of the converter according to FIG. 1 which are active during its preferred operation as step-up converter.

The design of the converter 1 according to FIG. 1 comprises the step-up converter 22, which comprises the switching element 13 in the form of the MOSFET 20 and the freewheeling diode 15 of the conduction path 11 and the larger (first) inductor 8, and is illustrated in FIG. 2. During operation of the step-up converter by clocking the switching element 13, a flow of current 23 and, correspondingly, a flow of energy 24 occurs in the direction from the DC-voltage intermediate circuit 3 with lower voltage U_low to the DC-voltage intermediate circuit 2 with higher voltage U_high. The step-up converter 22 according to FIG. 2 in the case of the converter 1 according to FIG. 1 is combined with a step-down converter 25 according to FIG. 3, which step-down converter comprises the switching element 12 in the form of the IGBT 19 and the freewheeling diode 14 of the conduction path 10 and the series connection composed of the smaller (second) inductor 18 and the larger (first) inductor 8. During operation of the step-down converter 25 by clocking the switching element 12, a flow of current 26 and a flow of energy 27 occur between the DC-voltage intermediate circuits 2 and 3, the directions of which are opposite to those of the flow of current 23 and the flow of energy 24 in the case of the step-up converter according to FIG. 2.

Figure 3:
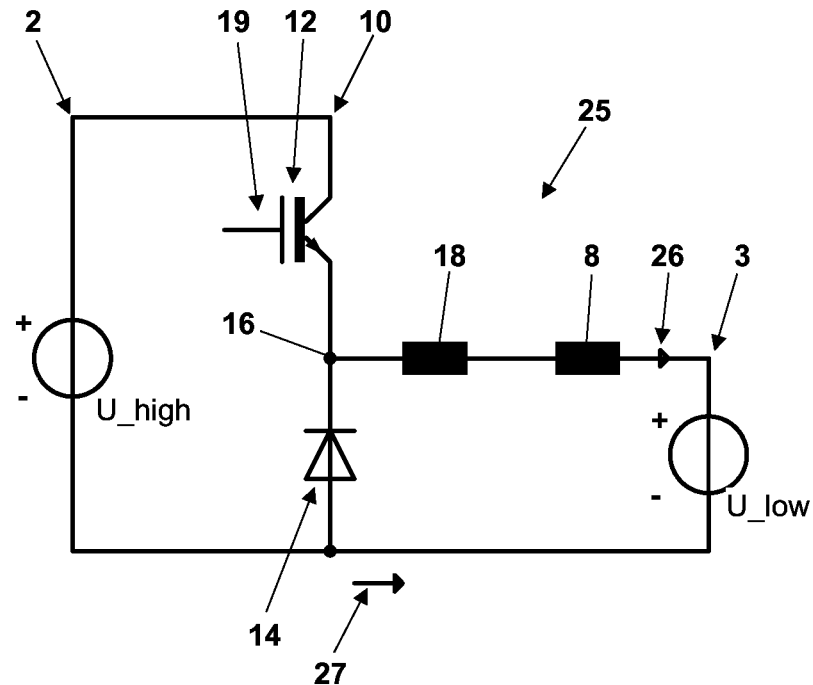
FIG. 3 shows the parts of the converter according to FIG. 1 which are active during its less preferred operation as step-down converter according to one embodiment.

In the case of the converter 1 according to FIG. 1, by selective high-frequency clocking of one of the switching elements 12 and 13, the function of the step-down converter 25 according to FIG. 3 or of the step-up converter 22 according to FIG. 2 can be realized. Thus, a flow of current 28 and a flow of energy 29 are possible in both directions between the DC-voltage intermediate circuits 2 and 3. However, there exists the danger that, when the switching element 12 is opened during operation of the converter 1 as step-down converter, the current does not commutate onto the freewheeling diode 14 provided for this purpose but rather onto the body diode 21 of the MOSFET 20 which is provided as switching element 13 for the operation of the converter 1 as step-up converter. This undesired commutation of the current onto the body diode 21 is suppressed by the smaller (second) inductor 18 connected between the center points 16 and 17 of the two conduction paths 10 and 11, which smaller inductor acts together with the larger (first) inductor 8 as inductive voltage divider. Thus, the voltage present across the freewheeling diode 14 when the switching element 12 is opened during operation of the converter 1 as a step-down converter is significantly higher than the voltage present across the body diode 21. Correspondingly, the current commutates onto the freewheeling diode 14, as desired. During operation of the converter 1 as a step-up converter by clocking the switching element 13, the smaller (second) inductor 18 has no voltage-dividing function. This is not necessary, however, because the IGBT 19 as switching element 12 has no body diode onto which commutation of the current must be prevented.

In the case of the converter 1 according to FIG. 1, the preferred operation of that converter is as a step-up converter. Therefore, the switching element 13 provided for the operation as a step-up converter is embodied as a MOSFET 20 which is more expensive in comparison with the IGBT 19. In the case of high-frequency clocking in the region of several 10 kHz, a MOSFET has lower switching losses than an IGBT. High-frequency clocking of the switching elements 12 and 13 is a requirement so that the larger (first) inductor 8 can be dimensioned so as to be small and hence light and inexpensive. During less preferred operation of the converter 1 according to FIG. 1 as step-down converter, the somewhat higher switching losses of the IGBT 19 are tolerated, which IGBT is less expensive than the MOSFET 20. The higher switching losses occur less often than the lower switching losses of the MOSFET 20.

Figure 4:
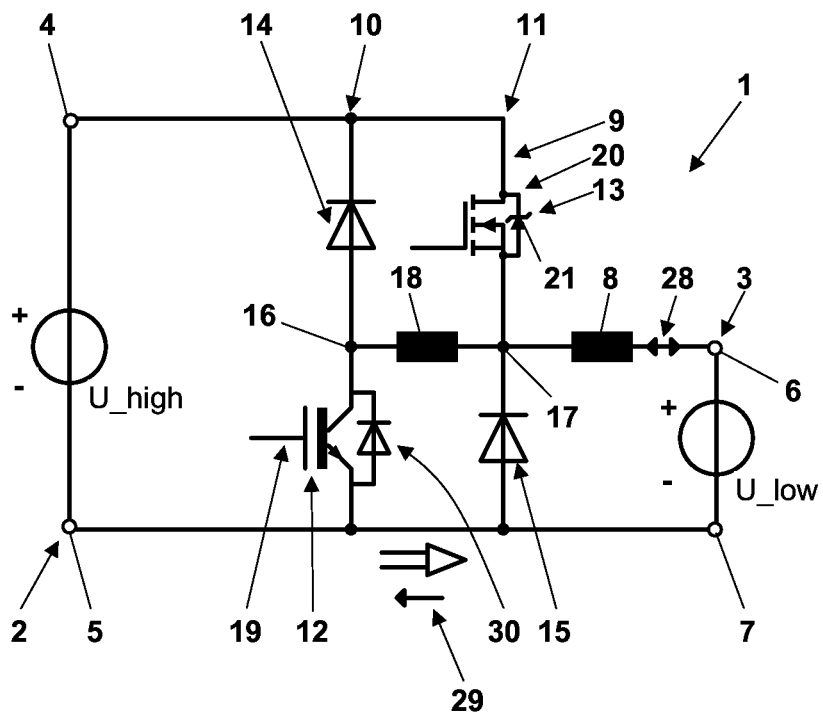
FIG. 4 shows a converter according to the disclosure, in which the preferred direction of the flow of energy runs from an intermediate circuit with higher voltage to an intermediate circuit with lower voltage according to one embodiment.

In the case of the converter 1 according to FIG. 4, the sequence of the switching elements 12 and 13 and the freewheeling diodes 14 and 15 is swapped in the two conduction paths 10 and 11 in comparison with FIG. 1. Furthermore, however, the switching element 12 in the conduction path 10, the center point 16 of which is connected via both inductors 18 and 8 to the connection 6, is the IGBT 19, while the switching element 13 in the conduction path 11, the center point 17 of which is connected only via the larger (first) inductor 8 to the connection 6, is the MOSFET 20. In this way, the converter 1 according to FIG. 4 is designed for preferred operation as a step-down converter with clocking of the switching element 13. Operation of the converter as a step-up converter with clocking of the switching element 12 is less preferred. During preferred operation of the two converters 1 according to FIGS. 1 and 4, the switching element 13 in the conduction path 11 is therefore always clocked, while during less preferred operation the switching element 12 in the conduction path 10 is clocked. During preferred operation, lower switching losses than in the less preferred operation always occur. The construction of the converter 1 is particularly simple in each case. The two converters 1 according to FIGS. 1 and 2 differ only in the arrangement of the switching elements 12 and 13 and the freewheeling diodes 14 and 15 in the two conduction paths 10 and 11.

The fact that, in FIG. 4, a protective diode 30 is provided connected in parallel with the switching element 12 in the form of the IGBT 19 is not a fundamental differentiating feature of a converter 1 with preferred operation as a step-down converter from a converter 1 with preferred operation as a step-up converter. Instead, such a protective diode could also be provided in the case of the IGBT 19 according to FIG. 1. In any case, it has a larger switch-on voltage than the freewheeling diode 15 connected in parallel therewith.

Figure 5:
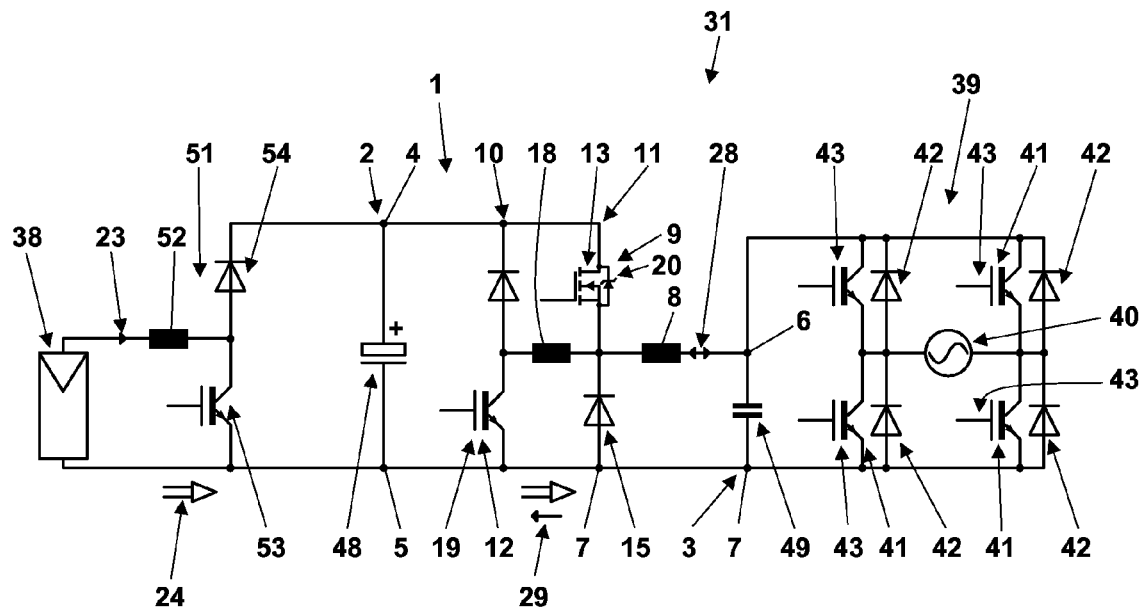
FIG. 5 shows a bidirectional inverter according to the disclosure having a converter according to FIG. 4 and an output-side commutator.

In the case of the reactive power-capable inverter 31 according to the disclosure and illustrated in FIG. 5, the converter 1 has the construction according to FIG. 4, except for the protective diode 30 which is not present in this case, and is preferably operated as step-down converter by clocking the switching element 13, while, by clocking the switching element 12, the converter is also operable as step-up converter. During operation as a step-down converter, the converter forms half-waves from the current flowing from the DC-voltage intermediate circuit 2. A photovoltaic generator 38 is connected via a step-up converter 51 to the intermediate circuit capacitor 48 of the DC-voltage intermediate circuit 2. The step-up converter 51 has a step-up converter inductor 52, a step-up converter switch 53 and a step-up converter diode 54 in the typical arrangement according to FIG. 2. The DC-voltage intermediate circuit 3 has a smaller intermediate circuit capacitor 49 which is used only for smoothing the switch ripple in the case of the half-waves of the current. A commutator 39 connected downstream of the DC-voltage intermediate circuit 3 reverses the polarity of every second half-wave of the current and thus feeds an alternating current into a connected alternating power grid 40. The commutator is formed from switching elements 41 and freewheeling diodes 42 in a known manner. The switching elements 41 are embodied as IGBTs 43. Owing to the possibility of operating the converter 1 as a step-up converter, the inverter 31 according to FIG. 5 is also completely reactive power-capable, by enabling a flow of current from the alternating power grid 40 to the DC-voltage intermediate circuit 2.

Figure 6:
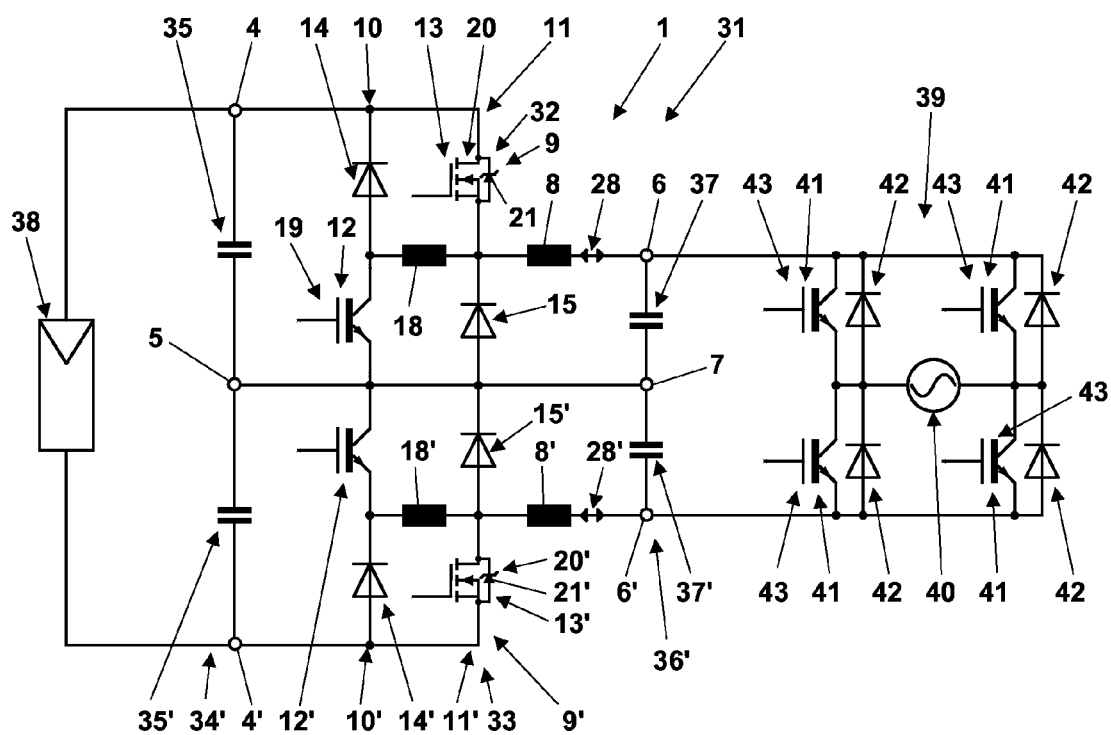
FIG. 6 shows a bidirectional inverter according to the disclosure having a converter which has two subcircuits in mirror-symmetrical arrangement corresponding to FIG. 4 and an output-side commutator.

In the case of the reactive power-capable inverter 31 according to the disclosure and illustrated in FIG. 6, a converter 1 has two subcircuits 32 and 33 each of which corresponds to a converter 1 according to FIG. 4, except for the protective diode 30 which is not present in this case. Therefore, the parts of the subcircuit 32 are provided here with the same reference signs as the parts of the converter in FIG. 4, while the parts of the subcircuit 33 are provided with same reference signs which are extended by a prime mark "'". The two subcircuits 32 and 33 are designed and arranged so as to be mirror-symmetrical with respect to their common connections 5 and 7 and the common connection thereof, except for the forward directions of their freewheeling diodes 14 and 15 and 14' and 15' and the blocking directions of their switching elements 12 and 13 and 12' and 13'. Each subcircuit 32 and 33 therefore has its own half-bridge 9 or 9'. The two half-bridges 9 and 9' are connected on the input side to two parts of a divided DC-voltage intermediate circuit 34, that is to say in this case to one of two series-connected capacitors 35 and 35'. On the output side, the subcircuits 32 and 33 are connected to two parts of an output-side DC-voltage intermediate circuit 36, which in this case are represented by series-connected capacitors 37 and 37'. The two subcircuits 32 and 33 are combined to form a converter 1, which is preferably operated as a step-down converter by coordinated clocking of the switching elements 13 and 13', while it is also operable as a step-up converter by coordinated clocking of the switching elements 12 and 12'. During operation as a step-down converter, the converter forms half-waves from a current which is generated by a photovoltaic generator 38, which is directly connected to the DC-voltage intermediate circuit 34 in this case. A commutator 39 connected downstream of the divided DC-voltage intermediate circuit 36, having the same construction and the same function as in FIG. 5, reverses the polarity of every second half-wave and thus feeds an alternating current into a connected alternating power grid 40. Owing to the possibility of operating the converter 1 as a step-up converter, the inverter 31 according to FIG. 6 is also completely reactive power-capable, by enabling a flow of current from the system to the divided DC-voltage intermediate circuit 34.

Figure 7:
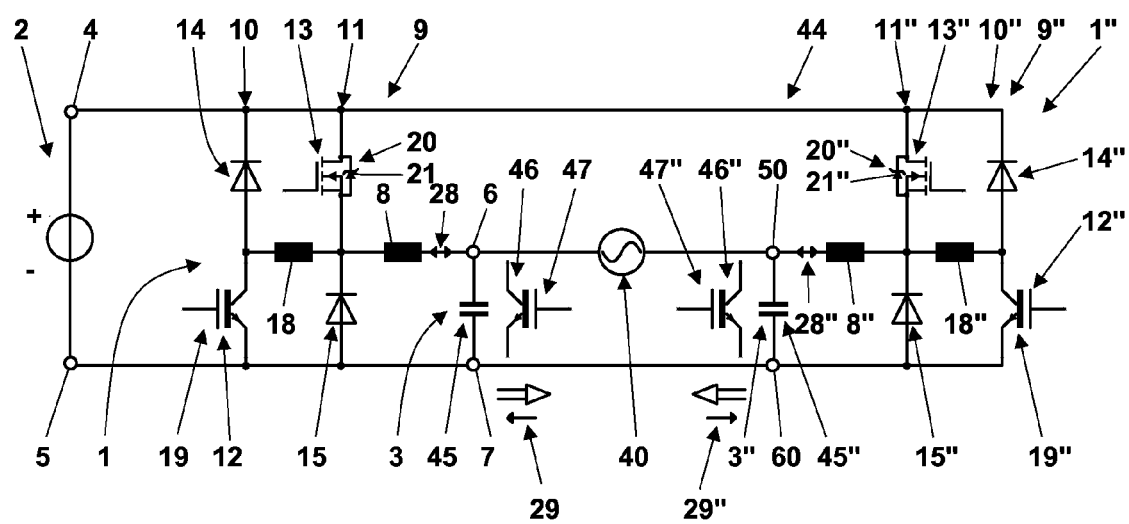
FIG. 7 shows a reactive power-capable inverter according to the disclosure having two bidirectional converters according to the disclosure operated in half-waves, which converters likewise substantially correspond to FIG. 4.

FIG. 7 illustrates a further reactive power-capable inverter 44 according to the disclosure. In this case, two half-bridges 9 and 9' having fundamentally the same construction as in FIG. 4, except for protective diodes, which are not present in this case, are connected in parallel with one another to the connections 4 and 5. The other connections of the one half-bridge 9 are the third connection 6 and the fourth connection 7, while the connections of the other half-bridge 9" are a fifth connection 50 and a sixth connection 60. The further parts of the one half-bridge 9 are provided with the same reference signs in this case as the parts of the converter 1 in FIG. 4, while the further parts of the other half-bridge 9" are provided with same reference signs extended by a double prime mark "''". The connections 6 and 50, which correspond to one another, of the two half-bridges 9 are connected to the alternating power grid 40, while their connections 7 and 60 are connected to one another. The inverter 44 thus dispenses with a specific commutator. Instead, the half-bridges 9 and 9" are operated alternately in half-waves as step-down converters in order to form a half-wave of the current to be fed into the alternating power grid 40. The half-bridge 9 or 9" which is respectively inactive in this case is connected through, by the switching element 12 or 12" thereof in the form of the IGBT 19 or 19" being permanently closed. Alternatively, a capacitor 45 or 45" forming the respective DC-voltage intermediate circuit 3 or 3" can be bypassed by an additional bypass switch 46 or 46" in the form of an IGBT 47 or 47" in order to avoid ohmic losses in the case of a flow of current through the inductors 8 and 18 and 8" and 18". The inverter 44 is reactive power-capable, too, because each of its half-bridges 9 or 9" and the converter 1 or 1" provided thereby is bidirectional and thus can be operated as step-up converter in order to allow a current to flow from the system into the DC-voltage intermediate circuit 2 at higher voltage.

The invention claimed is:

1. A bidirectional converter, comprising:
   a first connection, a second connection, a third connection and a fourth connection,
   wherein the first and the second connections form a pair of high voltage-side connections between which a first voltage is present during operation of the converter, and
   wherein the third and the fourth connections form a pair of low voltage-side connections between which a second voltage is present during operation of the converter, wherein the first voltage is at least as high as the second voltage,
   a first inductor and a second inductor,
   a half-bridge comprising two switching elements and two freewheeling diodes,
   wherein the half-bridge is divided into a first conduction path and a second conduction path, which are connected together in parallel between the first connection and the second connection,
   wherein, in each of the first and second conduction paths, one of the switching elements and one of the freewheeling diodes are connected in series, and center points of the first and second conduction paths are connected to one another via the second inductor,
   wherein the switching element in the first conduction path is connected to another connection of the pair of high voltage-side connections than the switching element in the second conduction path, and the freewheeling diode in the first conduction path is connected to another connection of the pair of high voltage-side connections than the freewheeling diode in the second conduction path,
   wherein the half-bridge has a first operating mode, in which the switching element in the first conduction path is clocked at a high frequency in order to cause a flow of energy in a first direction between the pair of high voltage-side connections and the pair of low voltage-side connections,
   wherein the half-bridge has a second operating mode, in which it drives the switching element in the second conduction path at a high frequency in order to cause a flow of energy in a second direction which is opposite to the first direction between the pair of high voltage-side connections and the pair of low voltage-side connections, and
   wherein the switching element in the second conduction path has a body diode, and
   wherein the first inductor is connected between the center point of the second conduction path and the third connection,
   wherein the second inductor and the first inductor are connected in series between the center point of the first conduction path and the third connection, while only the first inductor is connected between the center point of the second conduction path and the third connection, and
   wherein the two switching elements are of different types, wherein the switching element in the first conduction path does not have a body diode and causes higher switching losses than the switching element in the second conduction path.

2. The converter of claim 1, wherein the second direction is a preferred direction of the flow of energy between the pair of high voltage-side connections and the pair of low voltage-side connections.

3. The converter of claim 1, wherein the switching element in the first conduction path is an insulated gate bipolar transistor (IGBT) and the switching element in the second conduction path is a field effect transistor (FET).

4. The converter of claim 1, wherein a preferred direction of the flow of energy runs from the pair of high voltage-side connections to the pair of low voltage-side connections.

5. The converter of claim 4, wherein the switching element in the second conduction path is connected between the center point of the second conduction path and the first connection.

6. The converter of claim 1, wherein the switching element in the first conduction path has a protective diode connected in parallel therewith, which protective diode has the same forward direction between the first connection and the second connection as the freewheeling diode in the first conduction path.

7. The converter of claim 1, further comprising a smoothing capacitor connected between the first connection and the second connection and/or the third connection and the fourth connection.

8. The converter of claim 1, further comprising a further half-bridge, wherein the two half-bridges are designed and arranged so as to be mirror-symmetrical about a common connection of the common second connection and the common fourth connection of the two half-bridges except for the forward directions of their diodes and the blocking directions of their switching elements.

9. An inverter including a bidirectional converter, the converter comprising:
   a first connection, a second connection, a third connection and a fourth connection,
   wherein the first and the second connections form a pair of high voltage-side connections between which a first voltage is present during operation of the converter, and
   wherein the third and the fourth connections form a pair of low voltage-side connections between which a second voltage is present during operation of the converter, wherein the first voltage is at least as high as the second voltage,
   a first inductor and a second inductor,
   a half-bridge comprising two switching elements and two freewheeling diodes,
   wherein the half-bridge is divided into a first conduction path and a second conduction path, which are connected together in parallel between the first connection and the second connection,
   wherein, in each of the first and second conduction paths, one of the switching elements and one of the freewheeling diodes are connected in series, and center points of the first and second conduction paths are connected to one another via the second inductor,
   wherein the switching element in the first conduction path is connected to another connection of the pair of high voltage-side connections than the switching element in the second conduction path, and the freewheeling diode in the first conduction path is connected to another connection of the pair of high voltage-side connections than the freewheeling diode in the second conduction path,
   wherein the half-bridge has a first operating mode, in which the switching element in the first conduction path is clocked at a high frequency in order to cause a flow of energy in a first direction between the pair of high voltage-side connections and the pair of low voltage-side connections,
   wherein the half-bridge has a second operating mode, in which it drives the switching element in the second conduction path at a high frequency in order to cause a flow of energy in a second direction which is opposite to the first direction between the pair of high voltage-side connections and the pair of low voltage-side connections, and wherein the switching element in the second conduction path has a body diode, and wherein the first inductor is connected between the center point of the second conduction path and the third connection, wherein the second inductor and the first inductor are connected in series between the center point of the first conduction path and the third connection, while only the first inductor is connected between the center point of the second conduction path and the third connection, and wherein the two switching elements are of different types, wherein the switching element in the first conduction path does not have a body diode and causes higher switching losses than the switching element in the second conduction path, and the inverter further including a commutator, one side of the commutator being connected to the third connection and the fourth connection of the half-bridge, and the other side of the commutator being configured to be connected to an alternating power grid.

10. The inverter of claim 9, wherein the switching element in the second conduction path is connected between the center point of the second conduction path and the first connection.

11. The inverter of claim 9, wherein the commutator has IGBTs as switching elements.

12. An inverter including a bidirectional converter, the converter comprising:
    a first connection, a second connection, a third connection and a fourth connection,
    wherein the first and the second connections form a pair of high voltage-side connections between which a first voltage is present during operation of the converter, and
    wherein the third and the fourth connections form a pair of low voltage-side connections between which a second voltage is present during operation of the converter, wherein the first voltage is at least as high as the second voltage,
    a first inductor and a second inductor,
    a half-bridge comprising two switching elements and two freewheeling diodes,
    wherein the half-bridge is divided into a first conduction path and a second conduction path, which are connected together in parallel between the first connection and the second connection,
    wherein, in each of the first and second conduction paths, one of the switching elements and one of the freewheeling diodes are connected in series, and center points of the first and second conduction paths are connected to one another via a smaller inductor,
    wherein the switching element in the first conduction path is connected to another connection of the pair of high voltage-side connections than the switching element in the second conduction path, and the freewheeling diode in the first conduction path is connected to another connection of the pair of high voltage-side connections than the freewheeling diode in the second conduction path,
    wherein the half-bridge has a first operating mode, in which the switching element in the first conduction path is clocked at a high frequency in order to cause a flow of energy in a first direction between the pair of high voltage-side connections and the pair of low voltage-side connections,
    wherein the half-bridge has a second operating mode, in which it drives the switching element in the second conduction path at a high frequency in order to cause a flow of energy in a second direction which is opposite to the first direction between the pair of high voltage-side connections and the pair of low voltage-side connections, and
    wherein the switching element in the second conduction path has a body diode, and
    wherein the first inductor is connected between the center point of the second conduction path and the third connection,
    wherein the second inductor and the first inductor are connected in series between the center point of the first conduction path and the third connection, while only the first inductor is connected between the center point of the second conduction path and the third connection, and
    wherein the two switching elements are of different types, wherein the switching element in the first conduction path does not have a body diode and causes higher switching losses than the switching element in the second conduction path, and
    the further converter comprising a further half-bridge, wherein the half-bridge and the further half-bridge are designed and arranged so as to be mirror-symmetrical about a common connection of the common second connection and the common fourth connection of the two half-bridges except for the forward directions of their diodes and the blocking directions of their switching elements, and
    the inverter further including commutator, one side of the commutator being connected to the third connections of the half-bridge and the further half-bridge, and the other side of the commutator being configured to be connected to an alternating power grid.

13. The inverter of claim 12, wherein the commutator has IGBTs as switching elements.

14. An inverter including a bidirectional converter, the converter comprising:
    a first connection, a second connection, a third connection and a fourth connection,
    wherein the first and the second connections form a pair of high voltage-side connections between which a first voltage is present during operation of the converter, and
    wherein the third and the fourth connections form a pair of low voltage-side connections between which a second voltage is present during operation of the converter, wherein the first voltage is at least as high as the second voltage,
    a first inductor and a second inductor,
    a half-bridge comprising two switching elements and two freewheeling diodes,
    wherein the half-bridge is divided into a first conduction path and a second conduction path, which are connected together in parallel between the first connection and the second connection,
    wherein, in each of the first and second conduction paths, one of the switching elements and one of the freewheeling diodes are connected in series, and center points of the first and second conduction paths are connected to one another via the second inductor,
    wherein the switching element in the first conduction path is connected to another connection of the pair of high voltage-side connections than the switching element in the second conduction path, and the freewheeling diode in the first conduction path is connected to another connection of the pair of high voltage-side connections than the freewheeling diode in the second conduction path, wherein the half-bridge has a first operating mode, in which the switching element in the first conduction path is clocked at a high frequency in order to cause a flow of energy in a first direction between the pair of high voltage-side connections and the pair of low voltage-side connections, wherein the half-bridge has a second operating mode, in which it drives the switching element in the second conduction path at a high frequency in order to cause a flow of energy in a second direction which is opposite to the first direction between the pair of high voltage-side connections and the pair of low voltage-side connections, and wherein the switching element in the second conduction path has a body diode, and wherein the first inductor is connected between the center point of the second conduction path and the third connection, wherein the second inductor and the first inductor are connected in series between the center point of the first conduction path and the third connection, while only the first inductor is connected between the center point of the second conduction path and the third connection, and wherein the two switching elements are of different types, wherein the switching element in the first conduction path does not have a body diode and causes higher switching losses than the switching element in the second conduction path, and the inverter further including a further bidirectional converter, identical to the converter and provided between the first connection and the second connection on one side, and a fifth connection and a sixth connection on another side, wherein an alternating power grid is connectable to the third connection and the fifth connection, which are connected via the larger inductors of the converter and the further converter to the center points of the second conduction paths of the two half-bridges of the converter and the further converter, and wherein the fourth connection and the sixth connection are connected to one another.

15. The inverter of claim 14, further comprising a bypass switch provided between the third connection and the fourth connection, and a further bypass switch provided between the fifth connection and the sixth connection.

16. The inverter of claim 15, wherein the bypass switch and the further bypass switch are IGBTs.

* * * * *